United States Patent [19]

Griggs

[11] Patent Number: 4,949,382
[45] Date of Patent: Aug. 14, 1990

[54] SPEECH-CONTROLLED PHONETIC TYPEWRITER OR DISPLAY DEVICE HAVING CIRCUITRY FOR ANALYZING FAST AND SLOW SPEECH

[75] Inventor: D. Thurston Griggs, Baltimore, Md.

[73] Assignee: Griggs Talkwriter Corporation, Baltimore, Md.

[21] Appl. No.: 254,000

[22] Filed: Oct. 5, 1988

[51] Int. Cl.⁵ .............................................. G10L 7/08
[52] U.S. Cl. .................................................... 381/44
[58] Field of Search ................................ 381/41–46, 381/110; 364/513.5; 400/86–87

[56] References Cited

U.S. PATENT DOCUMENTS

| | | | |
|---|---|---|---|
| 3,440,617 | 4/1969 | Lesti | 179/1 SA |
| 3,558,820 | 1/1971 | Baisch et al. | 178/17.5 |
| 3,646,576 | 2/1972 | Griggs | 179/1 SA |
| 3,798,372 | 3/1974 | Griggs | 179/1 SA |
| 3,808,371 | 4/1974 | Griggs | 179/1 SA |
| 3,846,856 | 11/1974 | Griggs | 179/1 SA |
| 3,869,576 | 3/1975 | Griggs | 179/1 SA |
| 4,039,754 | 8/1977 | Lokerson | 179/1 SA |
| 4,060,694 | 11/1977 | Suzuki et al. | 179/1 SD |
| 4,121,058 | 10/1978 | Jusko et al. | 179/15.55 T |
| 4,156,868 | 5/1979 | Levinson | 340/146.3 WD |
| 4,181,121 | 1/1980 | Pirz et al. | 179/1 SD |
| 4,272,813 | 6/1981 | Howell et al. | 364/900 |
| 4,388,495 | 6/1983 | Hitchcock | 179/1 SD |
| 4,412,098 | 10/1983 | An | 381/43 |
| 4,415,767 | 11/1983 | Gill et al. | 381/45 |
| 4,435,617 | 3/1984 | Griggs | 381/44 |
| 4,653,086 | 3/1987 | Laube | 379/96 |
| 4,675,840 | 6/1987 | Raymond et al. | 364/513.5 |

Primary Examiner—Gary V. Harkcom
Assistant Examiner—John A. Merecki
Attorney, Agent, or Firm—Joseph G. Seeber

[57] ABSTRACT

A speech-controlled device produces a visual representation (via a typewriter, printer or display device) of a spoken input. The device operates in real time without speaker-dependence, and comprises a fast speech analyzer (FSA) for analyzing the speech input as relatively fast speech and a slow speech analyzer (SSA) for analyzing the speech input as relatively slow speech. In a first embodiment, a selector is responsive to a determination that the speech input is relatively fast or slow speech for selecting the output of the FSA or SSA, as appropriate. In a second embodiment, an enable circuit is responsive to a determination that the speech input is relatively fast or slow for enabling a corresponding one of the analyzers for operation. The FSA comprises a first section which derives word features, a second section which derives word shapes, and a comparator for comparing word features and word shapes so that a word identification is made when coincidence occurs between the word features and the word shapes.

30 Claims, 10 Drawing Sheets

SPEECH-CONTROLLED PHONETIC TYPEWRITER OR DISPLAY DEVICE HAVING CIRCUITRY FOR ANALYZING FAST AND SLOW SPEECH

TECHNICAL FIELD

The present invention relates to a real-time speech-controlled phonetic typewriter or display device having fast and slow speech analysis circuitry.

BACKGROUND ART

The present inventor previously developed a speech-controlled phonetic typewriter or display device using a two-tier approach, the latter being disclosed in U.S. Pat. No. 4,435,617 Griggs, which is incorporated herein by reference thereto.

The previously patented typewriter or display device represented an advance over devices of the prior art, and provided for satisfactory transcription when presented with carefully enunciated speech. However, as speech becomes faster, more and more elements are dropped from, distorted in or abbreviated in such speech as it tries to keep pace with the thoughts of the speaker. As a result, too many phonemes are missing or are altered, and facile word identification and transcription by the use of phonemes is made difficult or impossible.

The present inventor has discovered that the typewriter or display device of previous U.S. Pat. No. 4,435,617 provides satisfactory transcription with carefully enunciated speech or until the speech becomes too fast. Once speech becomes too fast or is not carefully enunciated, words must be extracted, if at all, according to features of speech that are more gross and less precise than in the typewriter or display device previously disclosed and claimed.

The following patents are considered generally relevant as background art relative to the presently disclosed invention: U.S. Pat. Nos. 3,440,617; 3,558,820; 3,646,576; 3,798,372; 3,808,371; 3,846,586; 3,869,576; 4,039,754; 4,060,694; 4,121,058; 4,156,868; 4,181,821; 4,272,813; 4,388,495; 4,412,098; 4,415,767; 4,653,086; and 4,675,840.

DISCLOSURE OF INVENTION

The present invention generally relates to a real-time speech-controlled phonetic typewriter or display device having fast and slow speech analysis circuitry.

Prior to describing the invention in more detail, it would be helpful to define some terms:

Phoneme—a speech sound that functions distinctively within the structure of the language, reappearing as one of the constituents of various words.

Syllaphone—a term applied to a phoneme according to its familial or generic traits, which are based on how such a sound is articulated; e.g., any vowel, a nasal, a fricative.

Syllabit—counterpart of a syllable but within the spoken medium; a sequence of syllaphones making a pattern of joined articulations that recurs in the language in a distinctive way; it is arbitrarily defined to be a single isolated vowel or a sequence of syllaphones beginning with a vowel or a diphthong, or occurring after silence, and terminating upon appearance of the next vowel or diphthong, the start of a new word, or occurrence of silence.

Envelope—sequence of the syllaphones that outline the form or shape of a word; because the syllaphones are generic indications only, several kindred words may share the same envelope; an envelope may contain one or several syllabits.

Skeleton—a sequence of specific phonemes within an envelope which serve to distinguish that word from others; it is comprised of only the absolutely essential oral features that are distinctive for that word.

Voxbit—some sequence of time-segments of the sound spectrum that are arbitrarily defined according to syllabits that comprise a sequence of the same steps and duration; sequential, time-delineated subdivisions of a syllabit; each such time-segment consists of variable traits comprising distinctive features of the sound spectrum during such segments.

The presently disclosed device constitutes a real-time word identifier for normal, connected speech, the device functioning in real time without speaker dependence to extract word identities in English from normal communicative speech inputs conditional upon the level of intelligibility that is present. The device employs two modules, a fast speech analyzer (FSA) and a slow speech analyzer (SSA). Whereas the SSA operates generally in accordance with the two-tier method of speech analysis disclosed in previously referenced U.S. Pat. No. 4,435,617, the FSA operates in accordance with an altered version of the previously disclosed two-tier method of speech analysis so that operation thereof does not depend exclusively upon identification of phonemes. Rather, operation of the FSA is such that the FSA senses selected changes of spectral dynamics within each word in order to identify it. In this manner, the FSA serves to extract meanings from speech at a high rate of speech, specifically, higher than 120 words per minute.

The arrangement disclosed herein employs a tracking feature by means of which the rate of speech input is timed, and a determination is made as to which module, the FSA or SSA, is best suited to transcribe or represent the input at any given time in the course of speech, adjustments being made accordingly. In one embodiment, generally simultaneous outputs from the FSA and SSA are provided to a selector which, based on the input rate determined by one stage of the FSA, selects the appropriate output from the FSA or SSA for provision to a typewriter, printer or display device. In another embodiment, once the input rate is determined, either the FSA or the SSA is enabled to analyze the speech input.

The first embodiment shown herein comprises an FSA and an SSA operating in parallel and providing parallel outputs to a selector which, based on the rate of input speech, selects one of these two outputs as the output to be provided to the typewriter, printer or display device. In the second embodiment, once the input rate of speech is determined, one of the analyzers (the FSA or SSA) is enabled while the other is disabled so that only one analyzer operates at a given time. This renders unnecessary the provision of a selector at the output stage of both analyzers.

Therefore, it is a primary object of the present invention to provide a speech-controlled phonetic typewriter or display device having fast and slow speech analysis circuitry.

It is an additional object of the present invention to provide a speech-controlled phonetic typewriter or display device in which the rate of input speech is determined, and the determined rate of input speech is then utilized to select an appropriate one of the outputs of a fast speech analyzer and slow speech analyzer, respectively.

It is an additional object of the present invention to provide a speech-controlled phonetic typewriter or display device in which the rate of input speech is determined, and that rate is utilized to enable one of the analyzer circuits (fast speech analyzer or slow speech analyzer) while disabling the other analyzer circuit.

It is an additional object of the present invention to provide a speech-controlled phonetic typewriter or display device which functions, in real time and without speaker dependence, to extract word identities in English from normal communicative speech inputs conditional upon the level of intelligibility that is present.

The above and other objects of the invention, as will hereinafter appear, will be understood by reference to the following detailed description, the accompanying drawings, and the claims appended hereto.

BEST MODE FOR CARRYING OUT THE INVENTION

The invention will now be described in more detail with reference to the various figures of the drawings.

Figure 1A:
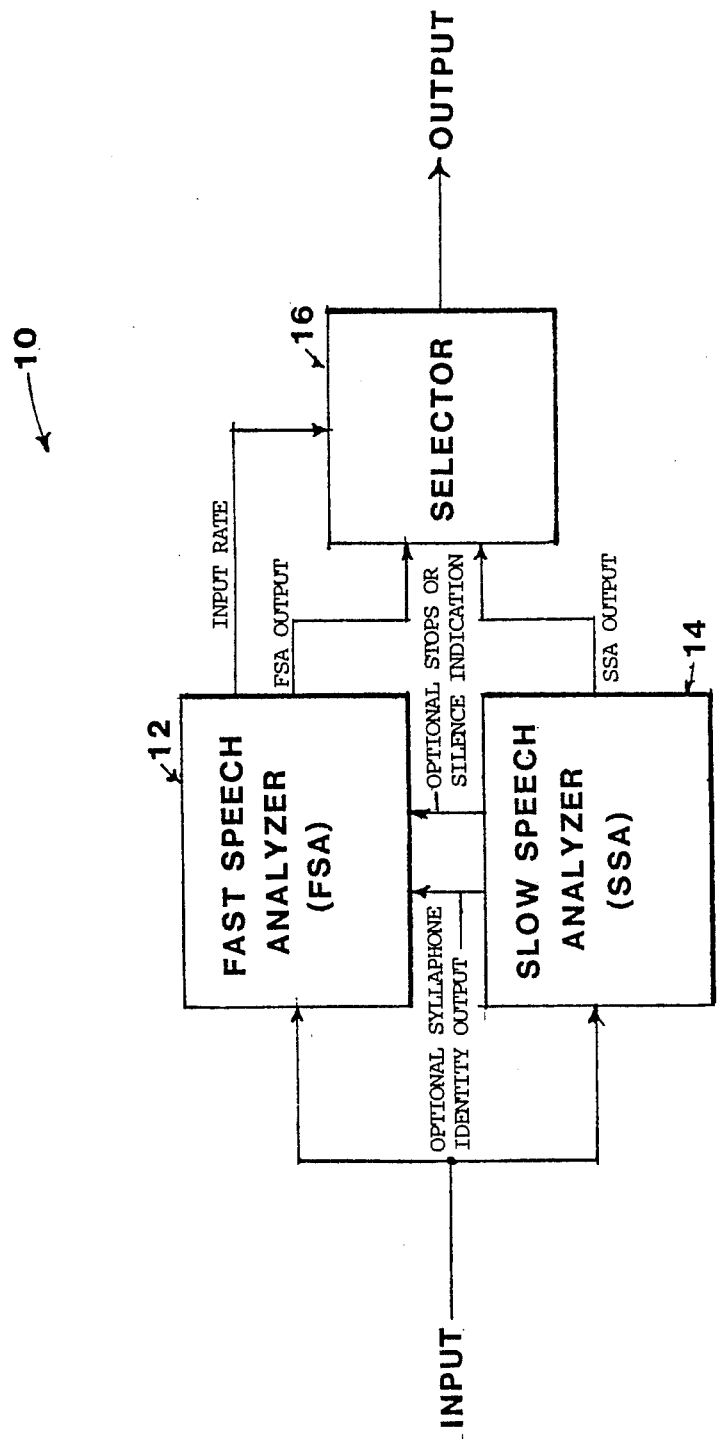
FIG. 1A is a block diagram of a first embodiment of the speech-controlled phonetic typewriter or display device of the present invention.

FIG. 1A is a block diagram of a first embodiment of the speech-controlled phonetic typewriter or display device of the present invention. As seen therein, the typewriter or display device 10 comprises a fast speech analyzer (FSA) 12, a slow speech analyzer (SSA) 14, and a selector 16 connected to the respective outputs of the analyzers 12 and 14.

In operation, a voice input is supplied simultaneously to the FSA 12 and SSA 14. The FSA 12 operates in accordance with an altered version of the techniques surrounding the two-tier concept of operation disclosed in previous U.S Pat. No. 4,435,617, and the operation of the FSA 12 will be described in more detail below with reference to FIG. 2. The SSA 14 operates as described in previous U.S. Pat. No. 4,435,617, the SSA 14 operating as a two-tier phoneme recognizer, that is, a device which supplies phoneme outputs mixed with word identifications. As discussed further below, SSA 14 provides an optional syllaphone identity output and an optional stops or silence indication to FSA 12. These two optional outputs of the SSA 14 are, preferably, provided by conventional elements (fricative transducer, diphthong transducer, nasal transducer, plosive sensor and stops transducer) in accordance with the teaching of U.S. Pat. No. 4,435,617.

The FSA 12 initially processes the input speech to determine the rate of input speech, and a corresponding INPUT RATE output is provided to the selector 16, the selector 16 additionally receiving the FSA output from FSA 12. The SSA 14, as stated above, provides its SSA output to the selector 16.

The selector 16 operates in a manner to be described below with reference to FIG. 7, and utilizes the input rate from FSA 12 to determine which output, that from FSA 12 or that from SSA 14, is to be provided as the output of the device 10. The output of selector 16 is provided to a typewriter, printer or display device (not shown) so that the speech input converted to a written output can be displayed.

FIG. 1B is a block diagram of a second embodiment of the speech-controlled phonetic typewriter or display device of the present invention. The elements and reference numerals are identical to those of FIG. 1A except that the selector 16 of FIG. 1A is eliminated and an FSA/SSA enable circuit 17 is provided.

Operation of the embodiment of FIG. 1B is the same as that of the embodiment of FIG. 1A except that, once the input rate is determined by the initial stage of FSA 12 (or by a separate timer circuit if desired), enable circuit 17 enables the remaining stages of FSA 12 for a fast speech input or enables the SSA 14 for a slow speech input. Enablement of one of the analyzers results in disabling of the other analyzer, as will be seen below in the description of FIG. 8.

It should be noted that, whereas the first embodiment provides both the FSA output and the SSA output regardless of which is selected for display, the second embodiment only provides the appropriate one of the FSA and SSA outputs.

Figure 2:
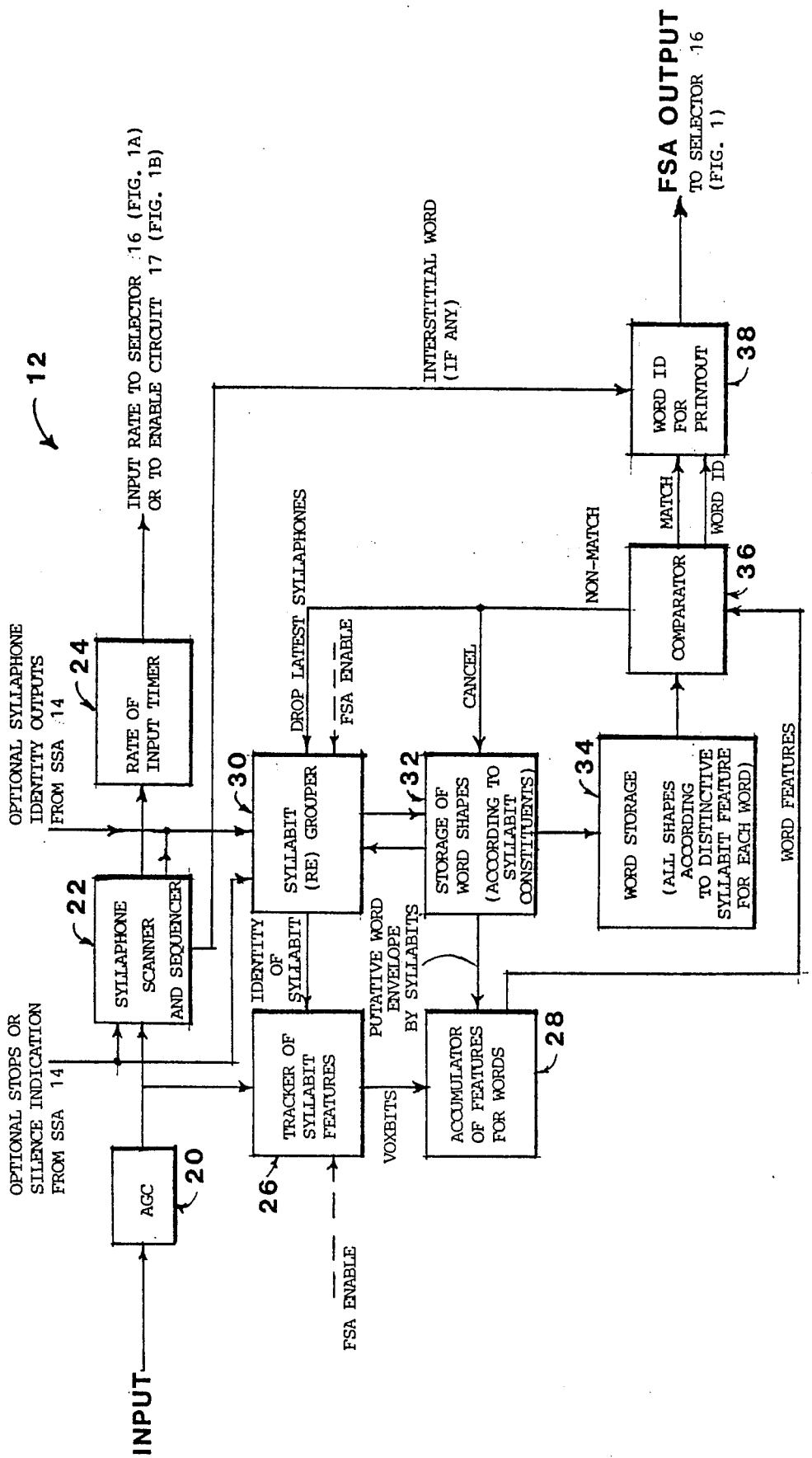
FIG. 2 is a block diagram of the fast speech analyzer of the speech-controlled phonetic typewriter or display device of the present invention.

FIG. 2 is a block diagram of the FSA 12 of FIGS. 1A and 1B. As seen therein, the FSA 12 comprises an automatic gain control (AGC) circuit 20, a syllaphone scanner and sequencer or envelope detector 22, a rate of input timer 24, a tracker of syllabit features 26, an accumulator of features for words 28, a syllabit grouper or regrouper 30, a storage unit or envelope storer 32 for storing word shapes according to syllabit constituents, a storage unit 34 for word storage (storage of all shapes according to distinctive syllabit features for each word), a comparator 36 which contains storage of feature (voxbit) sequence constituents for each word, and an output stage 38 which provides the word identification for printout or display The term "interstitial word" refers to inputs of short words that may be identified by the SSA 14 but not by the FSA 12 when both modules are operating in tandem.

The AGC circuit 20 is a conventional AGC circuit performing standard automatic gain control functions.

The syllaphone scanner and sequencer or envelope detector 22 is a syllaphone-determining device which successively establishes the identities of the sequence of classes of speech sounds (fricative, nasal, vowel or stop (plosive)). In accomplishing that task, the scanner and sequencer 22 uses processes and techniques also used in the two-tier typewriter or display device of U.S. Pat. No. 4,435,617.

Figure 1:
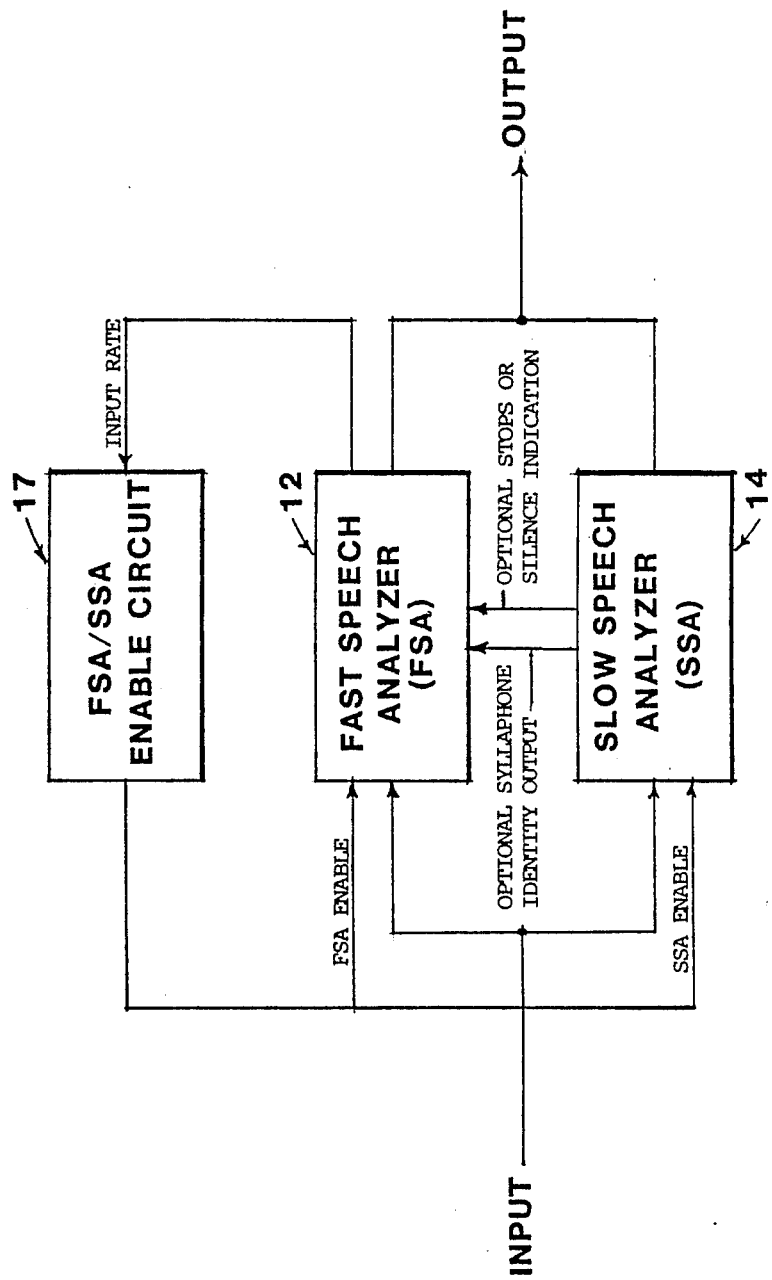
FIG. 1B is a block diagram of a second embodiment of the speech-controlled phonetic typewriter or display device of the present invention.
Figure 3:
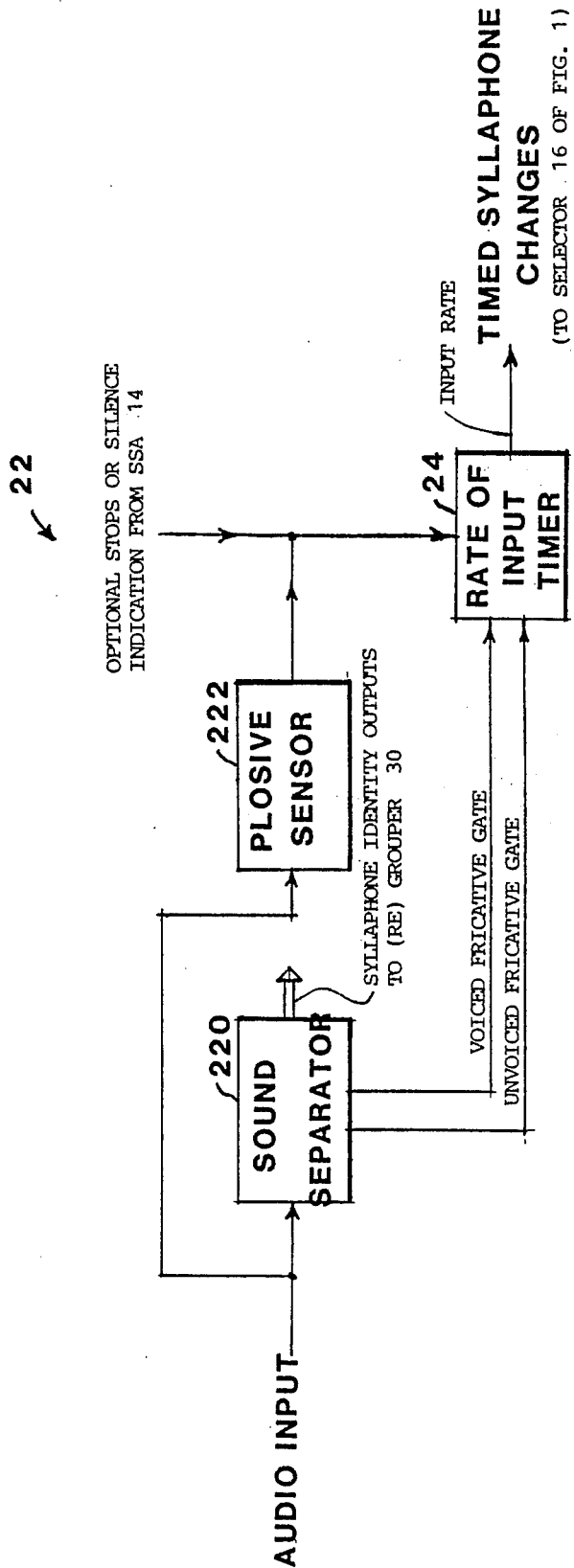
FIG. 3 is a block diagram of the syllaphone scanner and sequencer 22 of FIG. 2.

More specifically, as seen in FIG. 3, which is a block diagram of the scanner and sequencer 22, the scanner and sequencer 22 can be formed from the combination of a sound separator 220 and plosive sensor 222. Such an arrangement is shown in more detail in FIG. 1 of previous U.S. Pat. No. 4,435,617. The scanner and sequencer 22 provides an output comprising indicators of the class of sound detected.

Whereas plosive sensor 222 provides stops or silence indications to timer 24, such indications can be optionally provided by SSA 14 which, as indicated above, has its own plosive sensor in accordance with the teaching of U.S. Pat. No. 4,435,617.

Rate of input timer 24 is any conventional timing device for timing the rate of input speech. The recommended method for timing the rate of input speech involves measurement of the duration of the fricatives that are detected by syllaphone differentiation. For example, when fricatives last less than an experimentally determined value (for example, 10 milliseconds), fast speech analysis by FSA 12 (FIGS. 1A and 1B) is indicated.

Thus, rate of input timer 24 times the rate of input speech by performing timed tapping of the voiced and unvoiced fricative gates leading from the sound separator 220 to the fricative transducer 224 contained in the scanner and sequencer 22 of FIG. 3. Timer 24 then provides a timed indication of the rate of input speech, designated the INPUT RATE output, to the selector 16 of FIG. 1A or the enable circuit 17 of FIG. 1B, and a decision is made by selector 16 to select between the outputs of FSA 12 and SSA 14, or a decision is made by enable circuit 17 to enable FSA 12 or SSA 14.

Figure 4:
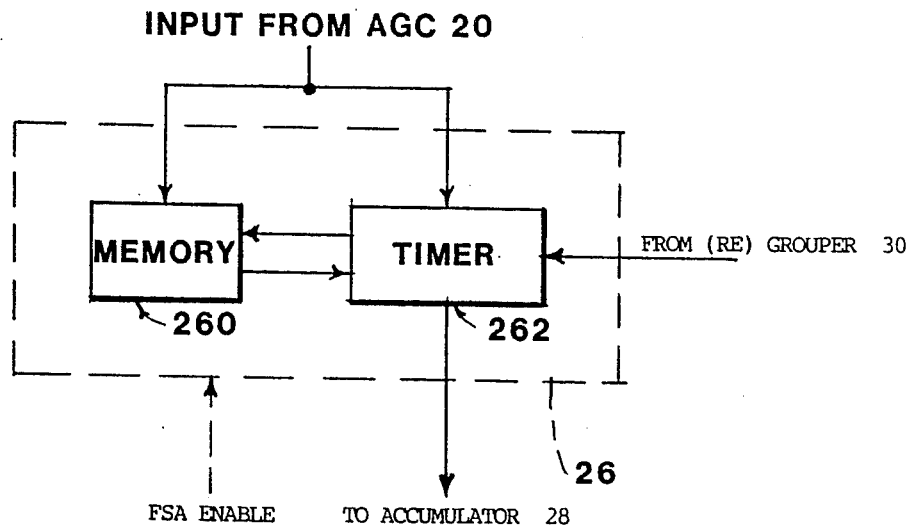
FIG. 4 is a block diagram of the tracker of syllabit features 26 of FIG. 2.
Figure 6A:
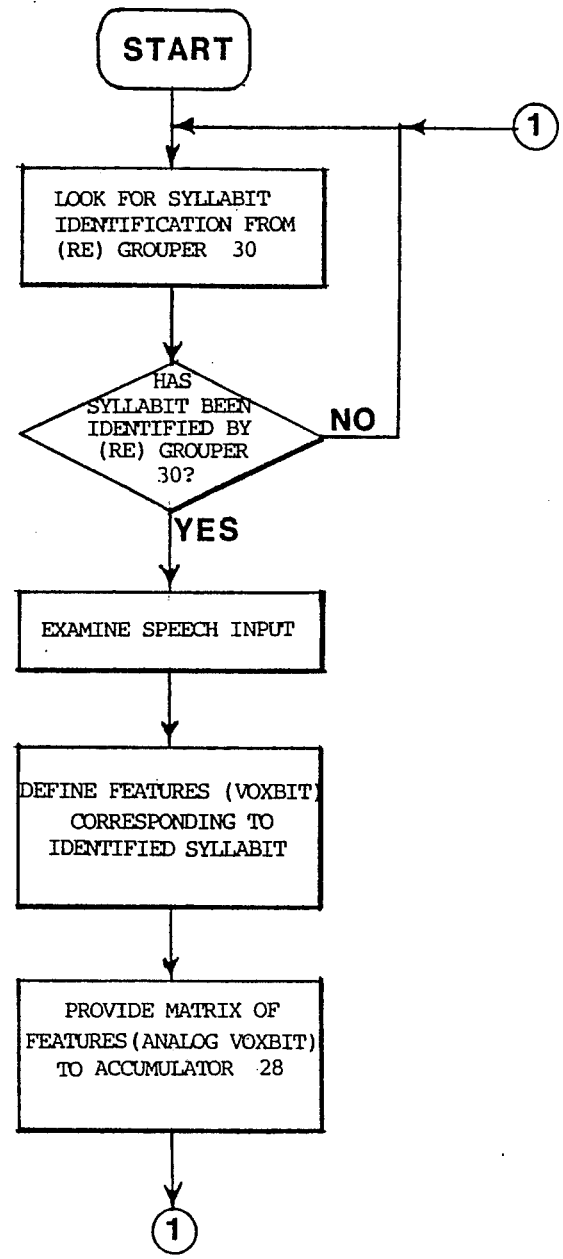
FIGS. 6A, 6B and 6C are flowcharts of the operations performed by the tracker of syllabit features, the accumulator and the (re)grouper, respectively, of FIG. 2.

FIG. 4 is a block diagram of the tracker of syllabit features 26 of FIG. 2, while FIG. 6A is a flowchart of the operations performed by the tracker of syllabit features 26. In general, the tracker of syllabit features 26 responds to identification of the syllabit by syllabit (re)grouper 30 by extracting, directly from the speech input (from AGC 20), the corresponding sequence of spectral phenomena so as to define each precise spectral feature that lies within the syllabit being identified. In the embodiment of FIG. 1B, tracker of syllabit features 26 is enabled by signal FSA ENABLE from enable circuit 17 when fast speech is indicated.

As seen in FIG. 4, the tracker of syllabit features 26 comprises a memory 260 and a timer 262. In general, timer 262 receives from (re)grouper 30 timing information relating to the duration of each syllabit identified by (re)grouper 30. Timer 262 uses this timing information to define the beginning and end points of each syllabit occurring in the speech input from AGC 20, and concurrently timer 262 times the duration of all syllabits within a given envelope. Thus, timer 262 defines the "time value" for each syllabit and simultaneously for each of the corresponding simultaneous voxbits. Preferably, timer 262 is a microprocessor programmed in accordance with the flowchart of FIG. 6A.

The memory 260 successively retains each sequence of spectral phenomena beginning at the end of the previously identified word or from a preceding silence. Thus, memory 260 retains the sequence of spectral phenomena involved in a putative envelope consisting of one or more syllabits. Due to the fact that that envelope may be shortened as word analysis progresses, and since syllabits may become reconstituted in that process (meaning that various shifting segments of the spectral changes are being analyzed as new units), memory 260 in effect photographs and preserves the entire sequence of spectral phenomena in its initial state so that identification and timing of the segments can be synchronized correctly in accordance with the syllabit structures.

Each stored syllabit defines both duration and time intervals to be used in reading various portions of the input sequence—analogous to a template, except that its values, rather than being fixed, will vary according to constantly shifting information from parallel and contemporaneous definition by the syllabits.

The matrices of specific spectral features (stored voxbits) that are analogous to variable templates are stored in the comparator 36, as mentioned above.

Figure 6B:
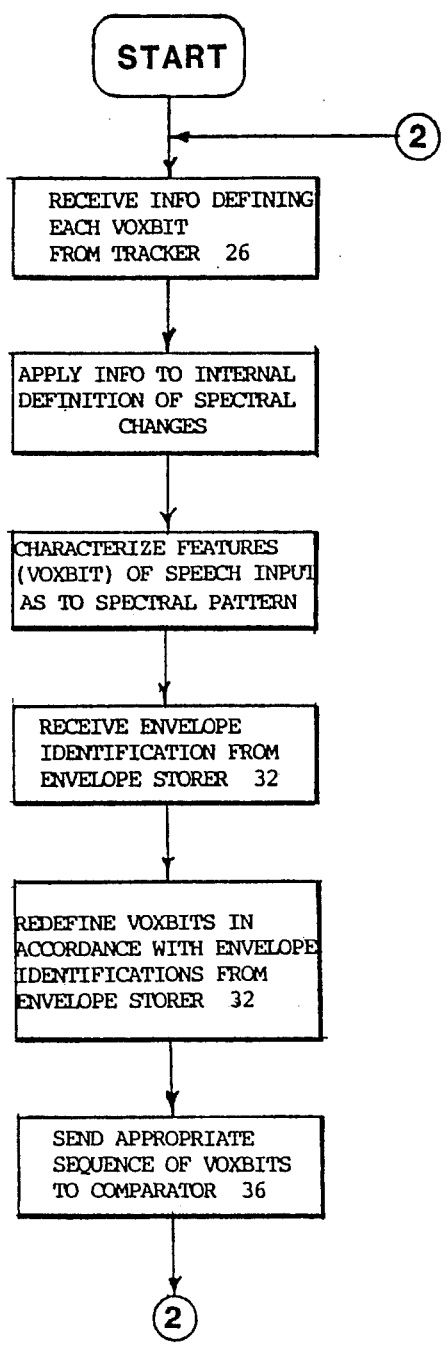

The accumulator 28 is, preferably, a microprocessor programmed in accordance with FIG. 6B, which is a flowchart of the operations performed by accumulator 28. In operation, the accumulator 28 uses the information identifying each syllabit, as developed and provided by timer 262, by applying that information to an internal definition of spectral changes occurring at specified intervals with respect to a number of different parameters (e.g., twelve or so). Specimen parameters of those changes are listed below and are identified by the letters "K" thru "V". Thus, combined sequential values define the voxbits In this manner, accumulator 28 effectively characterizes the voxbits from within the speech input. The operation of accumulator 28 is discussed in further detail below.

Figure 5:
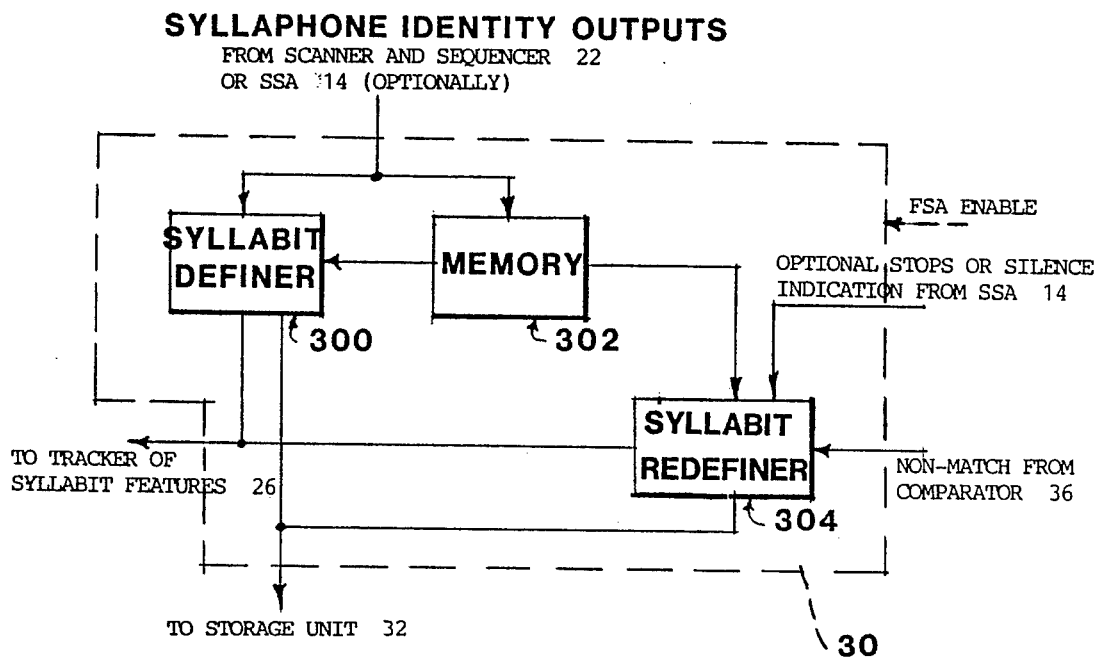
FIG. 5 is a block diagram of the syllabit (re)grouper 30 of FIG. 2.
Figure 6C:
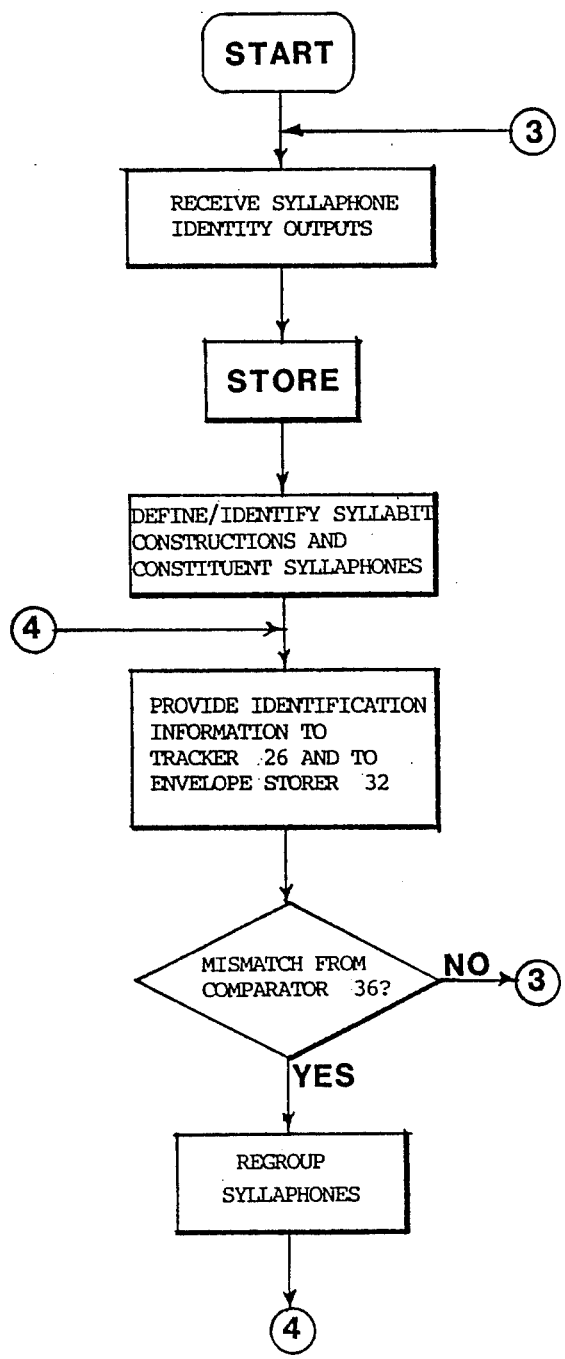

FIG. 5 is a block diagram of the syllabit (re)grouper 30 of FIG. 2, while FIG. 6C is a flowchart of the operations performed by the (re)grouper 30. As seen in FIG. 5, syllabit (re)grouper 30 comprises a syllabit definer 300, a memory 302, and a syllabit redefiner 304. The operations of definer 300 and redefiner 304 are, preferably, implemented by a microprocessor programmed in accordance with the flowchart of FIG. 6C. It should be noted that, in the embodiment of FIG. 1B, syllabit (re)-grouper 30 is enabled by the signal FSA ENABLE from the enable circuit 17.

In operation, the syllaphone identity outputs of scanner and sequencer 22, or optionally syllaphone identity outputs from SSA 14, are provided to syllabit definer 300 and are temporarily stored in a group in the memory 302, the contents of which are accessible by both definer 300 and redefiner 304. The syllabit definer 300 defines the syllabit constructions in view of the words being identified from the initial input, and gives that information to the tracker of syllabit features 26, as already discussed above. The definer 300 also provides the incoming syllabit groupings to the storage unit or envelope storer 32 (FIG. 2) so that the latter receives sequences of incoming syllaphones that constitute envelopes that are in storage.

Syllabit definer 300 of (re)grouper 30 of FIG. 5 defines or identifies syllabit constructions and corresponding syllaphones within a given envelope in accordance with the following rules (where N=nasals, S=stops, F=fricatives and V=vowels):

(1) The envelope consists of only one syllabit when it consists of a cluster of non-vowels only, or of a sequence of vowels only; for example:

N S S F or V V V V or V V.

(2) Each syllabit can contain not more than one separate vowel or sequence of vowels; it may not consist of a single syllaphone.

(3) A single non-vowel or cluster of non-vowels may follow or may precede the vowel unit, or both; for example:

S N V̱ V̱ F S V̱ V̱ N F V̱ V̱ V̱ N F V̱ V̱ S.

(4) At the end of an envelope, single vowel syllaphones are combined with the immediately preceding non-vowel syllaphone; in addition, at the beginning of an envelope, a non-vowel or cluster of non-vowels is combined with the first vowel or vowel sequence (for example, S N V̱ F S V̱ V̱ N V̱) and also with the next non-vowel unit that follows it (for example, F V̱ N S S V̱ V̱ S).

(5) Pairing of single non-vowel syllaphones with adjacent vowel units in sequences such as F V̱ N V̱ S V̱ F should proceed as follows F V̱ N (as prescribed above), then V̱ S V̱ F; the non-vowel is attached to the preceding rather than the following vowel.

In the FSA 12 of FIG. 1A, syllabits provide the shorthand needed to cope with rapid speech. The syllabit redefiner 304 of FIG. 5 functions to regroup the syllaphones, making other syllabits, in case of a mismatch between a putative word and the actual speech input. More specifically, during fast speech analysis, inputs are processed initially with respect to syllabits, which arbitrarily set lengths for the voxbits. However, syllabits must be reworked as they become broken up when words are identified (because words, by their beginnings and endings, redefine relevant syllabits). This reworking and redefinition of syllabit constructions is the function of redefiner 304, which receives inputs from memory 302, a non-match indicator from comparator 36, and (optionally) stops or silence indications from SSA 14. Finally, as indicated in FIG. 5, the redefined or latest syllabit constructions are provided to the tracker of syllabit features 26 of FIG. 2, as well as to the envelope storer 32 thereof.

As mentioned above, envelope storer 32 of FIG. 2 receives, from definer 300 and redefiner 304 of FIG. 5, sequences of incoming syllaphones that constitute possible word-envelopes from storage. Thus, generic information (in syllabits) is grouped to be matched, against vocabulary words stored for possible print-out, according to envelope configuration, into putative word-units in envelope storer 32. The envelope storer 32 passes envelope identifications (coded as to syllabit constituents) to the accumulator of features for words (or accumulator of voxbits) 28 (FIG. 2).

The accumulator 28 selects actual voxbits of specific spectral features to correspond to the envelope indicated by storer 32, and thus redefines voxbits according to the input from envelope storer 32, thereby altering the input from tracker of syllabit features 26 of FIG. 2 when relevant. Accordingly, the accumulator 28 sends the appropriate sequence of specific features from envelope storer 32 to the comparator 36.

The envelope storer 32 simultaneously passes, to the word storage unit 34, the envelope identity for the word presumably being identified so that the word storage unit 34 can select the appropriate voxbit patterns for provision to comparator 36, and so that such patterns can be compared to the word features provided by accumulator 28.

Thus, envelope storer 32 serves to store word shapes or envelopes according to their syllabit constituents. As indicated in FIG. 2, data flow in both directions between the (re)grouper 30 and the envelope storer 32. When the (re)grouper 30 identifies a syllabit that has been stored in envelope storer 32 because it appears in the language and comprises a word or part of a word, (re)grouper 30 signals that information to the tracker of syllabit features 26 (see the line indicating data flow from (re)grouper 30 to tracker of syllabit features 26 in FIG. 2), so that tracker 26 will obtain, from the speech input (via AGC 20), those features which characterize that particular time segment (that is, that particular syllabit).

Accumulator 28 of FIG. 2 serves as an accumulator of features for words or voxbits, receiving from envelope storer 32 putative word envelopes by syllabits. Thus, envelope storer 32 transmits to accumulator 28 an indication of a putative word envelope's (shape's) syllabit components, so that accumulator 28 will release the sequence of distinctive features of the speech input (the word features or voxbits) to comparator 36. At the same time that envelope storer 32 determines a tentative word identification according to syllabit composition, envelope storer 32 calls up from word storage unit 34 the relevant sequences of distinctive features for each word in that envelope (shape) to be matched against the WORD FEATURES output of accumulator 28. This matching procedure takes place in comparator 36, the latter receiving and comparing the WORD FEATURES output of accumulator 28 and the relevant sequences of distinctive features for each word in the envelope, as provided at the output of word storage unit 34.

As a result of the aforementioned comparison, comparator 36 provides either a NON-MATCH output to units 30 and 32 or a MATCH output to the stage 38. In the case of a non-match, that information is passed back, by comparator 36, to syllabit (re)grouper 30, which then aborts the current syllabit formation process by dropping final syllaphones, one by one, as a new word identification is sought. In the case of a non-match, the same abort message is passed, by comparator 36, to envelope storer 32, which merely cancels the storage of word shapes according to syllabit constituents.

Conversely, when there is a match in comparator 36, the identification of the word is processed by the stage 38. Stage 38 is an appropriately coded memory (read-only memory or ROM, for example) which, in response to determination of a match in comparator 36, releases the correct spelling of the identified word to the selector 16 of FIG. 1A in the first embodiment, or directly to the typewriter, printer or display device in the second embodiment. As mentioned previously, in the first embodiment, selector 16 (FIG. 1A) determines whether or not the FSA output will be utilized as the output of the voice-controlled typewriter, printer or display device.

It should be noted that, unlike the SSA 14 (FIGS. 1A and 1B), which is a phoneme-dependent module, the FSA 12 does not attempt to preserve fragments that do not fit into the overall pattern of speech input, nor does the FSA 12 retain individual syllabit transcriptions unless they belong to words that are identified. This is consistent with the purpose of FSA 12, which is to provide only the gist of what is said by identifying whatever words can be caught when uttered in very fast succession and caught in their entireties.

Thus, the FSA 12 is not intended to confuse reading by offering undigested fragments. Real-time operation calls for "fast reading" when speech is also fast. Some words intended will not be "heard", and comprehension will be dependent upon the gist and the "sense" of what is being said. Transcriptions performed by the FSA 12 will not be literary, and there may well be wrong words that appear from time to time.

In accordance with the concept of the present invention, however, when speech becomes more deliberate, accuracy increases as provided through the SSA 14 of FIGS. 1A and 1B. By way of example, an intended (spoken) sentence might be "The important thing is to find out the truth", but this might transcribe as "import thing fine truth". As in sign language, the meaning in context would be clear. Speakers usually stress the important words so they are most likely to be the ones that come through.

In order to provide an actual illustration of the concept and operation of the presently disclosed invention, the word "inclusion" should be considered. In accordance with fast speech analysis by the FSA 12 of FIGS. 1A and 1B, the envelopes for the word "inclusion" will be NSVVFN or NSVFN. The identity of the word "inclusion" will be entered under both envelopes in word storage unit or envelope storer 32. With respect to syllaphones, the envelope NSVVFN breaks down into NS and VVFN, that is, two syllabits. The envelope NSVFN breaks down into NS and VFN. Each of the two syllabits defines the time duration that will be analyzed in greater detail: the timing and mode of its analysis in the FSA 12. Each such segment will be measured at prescribed intervals with respect to pertinent values in accordance with parameters such as the following:

K—occurrence of a stop Y/N
L—burst occurs—voiced (defined by delta t) Y/N
M—burst occurs—voiceless (defined by delta t) Y/N
N—spectral location of the burst (6 options)
0—spectral location for fricatives (9 options)
P—steady spectra for fricatives Y/N
Q—frequency of peak of second formant *
R—frequency of peak of first formant *
S—amplitude ratio of second to first formant peaks (1–10)
T—amplitude ratio of fundamental to first formant peak (1–4)
U—suppression of third formant bandwidths Y/N
V—amplitude ratio of second formant peak to fundamental (1–10)

* Only a change up or down is tracked during the voxbit

The voxbit that results in the succeeding samples is comprised of the matrix pattern shown in this sequence. It will be matched against pre-stored matrices for various utterances that will have proved to be distinctive within the structure of the language through pre-analysis. The sequence of sounds represented by the word fragment "usion" in orthography will have a voxbit counterpart that will have been stored so as to be matched. A subsequent higher level of matching must also then occur in order to fit the voxbits into whole words (like syllables).

Accordingly, whole spoken words are broken down into syllabit constituents in the first instance. Then, those syllabits delineate sequences of precise acoustical features (voxbits). Finally, the voxbits are grouped into permissible or probable words. Since this whole process is putative, regroupings must occur continuously before the correct words become identified. For example, NSVVFN —a viable word envelope—might appear, whereas it was really a syllaphonic representation, as only one part of a longer sequence than was intended, or as a syllaphonic representation of something intended as NS V VFN. Alternatively, the voxbits might belong to parts of two other adjacent words so that they would not identify, when taken together, a viable word.

By way of further illustrating the voxbit concept, consider the word "confirmation". It breaks down into two voxbits: k nf and mA Γn. The first voxbit appears also in the word "conference", while the second voxbit appears also in the word "information" (in standard American dialect). It might appear from the above that we are dealing with syllables or groupings of syllables. That is not the case, but could be a useful analogy. On the contrary, definitions are being made not in accordance with written syllables, but rather in accordance with oral clusters that recur within the language. Voxbits differs from the skeletons of words in that, with voxbits, elisions or omissions or truncations may make it impossible to recognize the voxbits according to their expected, complete roster of phonemes, some of whose members may be only hinted at by the voice. Whereas in a skeleton, we expect something that resembles a voxbit but as a whole word, and are defining the word in terms of overt, identifiable speech sounds within it, with a voxbit, we are defining a sequence of oral phenomena that can vary in length somewhat but still retains its distinctive features, distinct from other such units and repetitively within the language.

Voxbits also have generic shapes analogous to the envelopes of words. Those shapes are various syllabits. In the design of the present invention, syllabits are used to define the lengths of respective voxbits putatively. Syllabits also assist in sorting out and delineating voxbits by defining their timing as segments in the stream of speech. Considering the example of the word "confirmation" discussed above, the probable syllabits are SVNF VN VFN (although experiments might alter that slightly). When that sequence of syllabits combines with voxbits that simultaneously show the voxbits that constitute the word "confirmation", then the word is identified as being present in accordance with the present invention.

Figure 7:
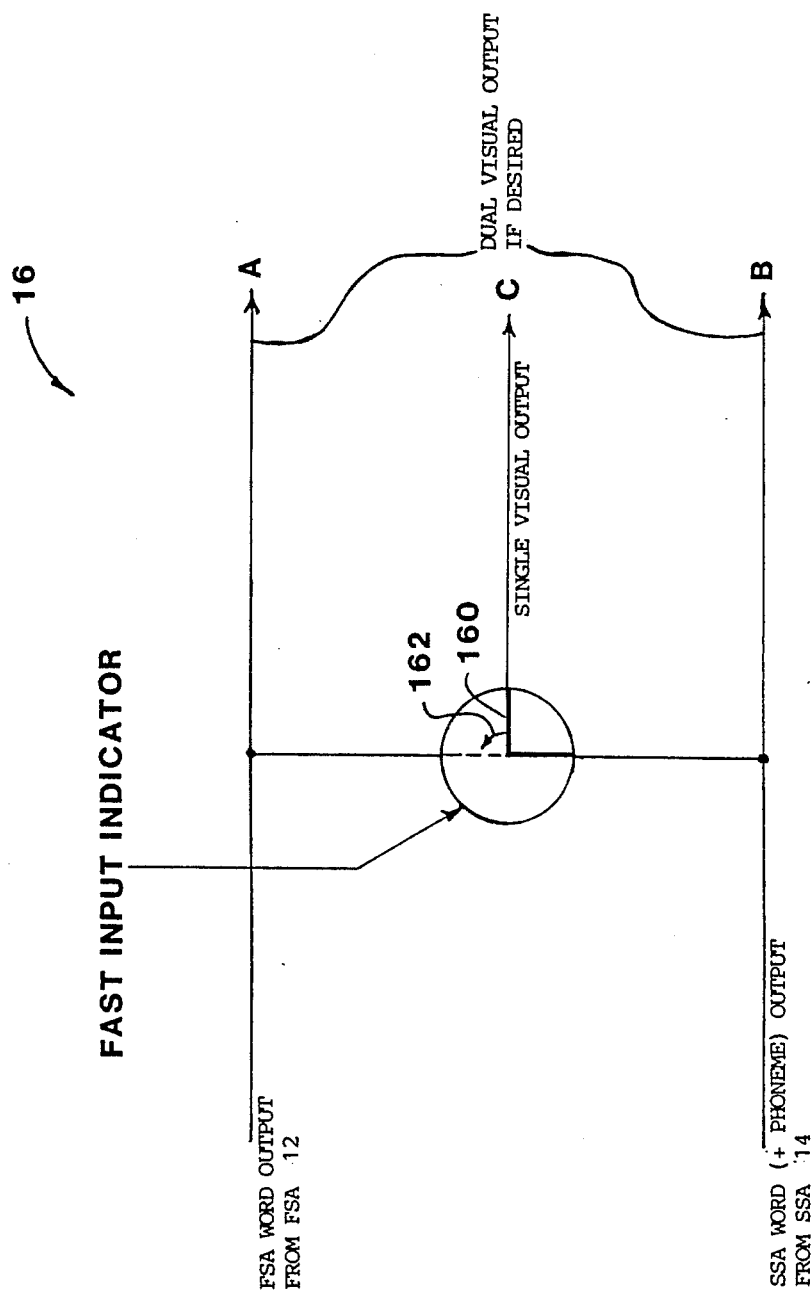
FIG. 7 is a detailed diagram of the selector of FIG. 1A.

FIG. 7 is a detailed diagram of the selector 16 of the embodiment of FIG. 1A. Preferably, the design of selector 16 is such that, if desired, a dual visual output (outputs A and B) consisting of the FSA word output from FSA 12 and the SSA word (plus phoneme) output from SSA 14 can be displayed visually at the same time.

However, a switch 160 is provided so that a single visual output can be selected, switch 160 being any conventional digitally operated or analog-operated switch. As indicated in FIG. 7, the position of switch 160, indicated by an inverted solid "L", is the normally assumed position of switch 160, resulting in visual display of the SSA word (plus phoneme) output from SSA 14. However, when FSA 12 indicates, via its INPUT RATE output (shown in FIG. 1A), that a fast speech input has been detected, the INPUT RATE output of FSA 12 acts as a "fast input indicator", and is provided as a control input to the switch 160, causing the switch 160 to rotate in the counter-clockwise direction by 90°, thus connecting the FSA word output from FSA 12 to the single visual output C of the selector 16, and disconnecting the SSA word (plus phoneme) output from SSA 14 from the single visual output C of the selector 16.

Whereas the switch 160 shown in FIG. 7 is merely illustrative of the type of switch and switching function called for by the present invention, it should be noted that any other type of digitally operated or analog-operated switch can be employed as well.

Figure 8:
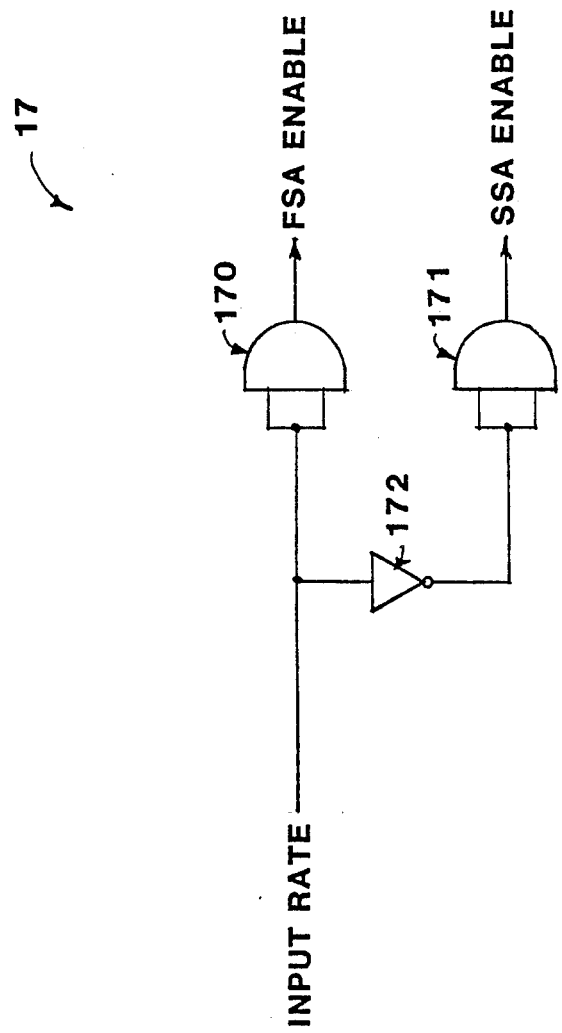
FIG. 8 is a detailed diagram of the enable circuit of FIG. 1B.

FIG. 8 is a detailed diagram of the enable circuit 17 of the embodiment of FIG. 1B. As seen therein, the enable circuit 17 comprises AND gates 170 and 171 and inverter 172.

In operation, AND gates 170 and 171 receive the control signal INPUT RATE from the initial stage of FSA 12 (or from a separate timer, if desired) of FIG. 1B. INPUT RATE is a digital signal which is "high" when the rate of speech input is above a predetermined value (indicating fast speech), and which is "low" when the rate of speech input is below the predetermined value (indicating slow speech). Thus, when fast speech is indicated, AND gate 170 generates a "high" (FSA ENABLE) output and AND gate 171 generates a "low" (SSA DISABLE) output. Conversely, when slow speech is indicated, AND gate 171 generates a "high" (SSA ENABLE) output and AND gate 170 generates a "low" (FSA DISABLE) output. Of course, other arrangements or protocols can be used to implement the enable circuit 17, as would be obvious to those of skill in the art.

While preferred forms and arrangements have been shown in illustrating the invention, it is to be understood that various modifications made be made without departing from the spirit and scope of this disclosure, the invention being limited only by the appended claims. For example, whereas the composition of the speech-controlled typewriter, printer or display device is shown above in block diagram form, consisting of a combination of various functional blocks, the functions described above can, for the most part, be implemented by hardware or software techniques known to those of skill in the art. Thus, various functions—such as those of the AGC 20, scanner and sequencer 22, timer 24, tracker 26, accumulator 28 and comparator 36—can be implemented by appropriately programmed digital processors, or by a single programmed microprocessor, in accordance with well-known software techniques. Similarly, the functions of the various storage units 30, 32 and 34 can be implemented by a plurality of digital memories, or by apportioned storage areas within a single digital memory (a random access memory or RAM).

I claim:

1. A device for producing an output corresponding to a visual representation of a speech input, comprising:
   analyzing means for analyzing the speech input as a relatively fast speech input to obtain a fast speech output and for analyzing the speech input as a relatively slow speech input to obtain a slow speech output;
   timer means for timing the speech input to determine whether the speech input is a relatively fast speech input or a relatively slow speech input; and
   selecting means for selecting the fast speech output as the output corresponding to the visual representation of the speech input when the timer means determines that the speech input is a relatively fast speech input and for selecting the slow speech output as the output corresponding to the visual representation of the speech input when the timer means determines that the speech input is a relatively slow speech input;
   wherein the speech input is analyzed as a relatively slow speech input based on identification of phonemes in the speech input, and wherein the speech input is analyzed as a relatively fast speech input based on processing of word features and word shapes derived from the speech input.

2. The device of claim 1, wherein said analyzing means comprises:
   word feature deriving ;means for deriving word features from the speech input;
   work shape deriving means for deriving word shapes from the speech input; and
   comparing means for comparing word features from said word feature deriving means with word shapes from said word shape deriving means to determine if coincidence exists therebetween;
   whereby to analyze the speech input as a relatively fast speech input by identifying words from the speech input when coincidence exists between the word features and the word shapes.

3. The device of claim 2, wherein said word feature deriving means comprises a first stage for tracking syllabit features in the speech input and providing, as an output, features for words in the speech input, and a second stage for accumulating the features for words provided as an output by said first stage.

4. The device of claim 3, wherein said first stage comprises a memory, a timer, means for providing an input corresponding to the speech input to said memory and said timer, and further means for providing to said timer timing information relating to a duration of each syllabit feature in the speech input, said timer and said memory using the timing information to provide an output identifying each syllabit in the speech input in terms of the features for words in the speech input.

5. The device of claim 2, wherein said word shape deriving means comprises a syllaphone scanner and sequencer responsive to the speech input for scanning and sequencing syllaphones within the speech input, said syllaphone scanner and sequencer providing syllaphone output corresponding to said word shapes, said word shape deriving means further comprising a syllabit grouper for grouping syllaphones into syllabits, a first storage unit for storing word shapes according to syllabit constituents as determined by said syllabit grouper, and a second storage unit for storing word shapes according to distinctive syllabit features for each word.

6. The device of claim 5, wherein said syllaphone scanner and sequencer comprises at least one of a sound separator and a plosive sensor for scanning and sequencing the syllaphones within the speech input to provide the syllaphone outputs corresponding to the word shapes.

7. The device of claim 6, wherein said syllaphone scanner and sequencer comprises a sound separator, said sound separator providing as an output an unvoiced fricative gate signal and a voiced fricative gate signal, said timing means being connected to said syllaphone scanner and sequencer for receiving the unvoiced fricative gate signal and the voiced fricative gate signal, said timing means being responsive thereto for providing, as an output, a timed indication of voiced and unvoiced fricatives, thereby determining whether the speech input is a relatively fast speech input or a relatively slow speech input.

8. The device of claim 5, wherein said syllabit grouper comprises a syllabit definer, a memory and a syllabit redefiner, said syllabit definer and said memory each receiving syllaphone outputs of said syllaphone scanner and sequencer, said syllabit definer and said syllabit redefiner being connected to said memory for accessing said memory, said syllabit definer providing an output indicating the grouping of syllaphones into syllabits based on an initial speech input, said syllabit redefiner providing an output indicating grouping of syllaphones into syllabits based on reprocessing subsequent to said initial speech input.

9. A method for producing an output corresponding to a visual representation of a speech input, comprising the steps of:
 (a) analyzing the speech input as a relatively fast speech input to obtain a fast speech output and analyzing the speech input as a relatively slow speech input to obtain a slow speech output;
 (b) timing the speech input to determine whether the speech input is a relatively fast speech input or a relatively slow speech input; and
 (c) selecting the fast speech output as the output corresponding to the visual representation of the speech input when step (b) determines that the speech input is a relatively fast speech input and selecting the slow speech output as the output corresponding to the visual representation of the speech input when step (b) determines that the speech input is a relatively slow speech input;
 wherein the speech input is analyzed as a relatively slow speech input based on identification of phonemes in the speech input, and wherein the speech input is analyzed as a relatively fast speech input based on processing of word features and word shapes derived from the speech input.

10. The method of claim 9, wherein said analyzing step (a) comprises:
 deriving word features from the speech input;
 deriving word shapes from the speech input; and
 comparing the word features with the word shapes to determine if coincidence exists therebetween;
 whereby to analyze the speech input as a relatively fast speech input by identifying words from the speech input when coincidence exists between the word features and the word shapes.

11. The method of claim 10, wherein said word feature deriving step comprises tracking syllabit features in the speech input to provide features for words identified in the speech input, and accumulating the features for words identified in the speech input by said tracking step.

12. The method of claim 10, wherein said word shape deriving step comprises scanning and sequencing syllaphones within the speech input to provide syllaphone outputs corresponding to said word shapes, grouping syllaphones in the syllaphone outputs into syllabits, storing word shapes according to syllabit constituents as determined by the grouping step, and storing word shapes according to distinctive syllabit features for each word.

13. The method of claim 12, wherein said scanning and sequencing step comprises performing at least one of sound separating and plosive sensing so as to scan and sequence the syllaphones within the speech input to provide the syllaphone outputs corresponding to the word shapes.

14. The method of claim 13, wherein said scanning and sequencing step comprises sound separating, said sound separating resulting in the generation of a voiced fricative gate signal and an unvoiced fricative gate signal, said step (b) comprising processing said voiced fricative gate signal and said unvoiced fricative gate signal to generate a timed indication of voiced and unvoiced fricatives, thereby determining whether the speech input is a relatively fast speech input or a relatively slow speech input.

15. The method of claim 12, wherein said grouping step comprises defining syllabits based on processing of an initial speech input, and redefining syllabits based on processing carried out subsequent to said initial speech input.

16. A device for producing an output corresponding to a visual representation of a speech input, comprising:
 timer means for timing the speech input to determine whether the speech input is a relatively fast speech input or a relatively slow speech input, said timer means generating a first enable signal when the speech input is a relatively fast speech input and generating a second enable signal when the speech input is a relatively slow speech input;
 first analyzing means responsive to the first enable signal for analyzing the speech input as a relatively fast speech input to obtain a fast speech output; and
 second analyzing means responsive to the second enable signal for analyzing the speech input as a relatively slow speech input to obtain a slow speech output;
 wherein the speech input is analyzed as a relatively slow speech input based on identification of phonemes in the speech input, and wherein the speech input is analyzed as a relatively fast speech input based on processing of word features and word shapes derived from the speech input.

17. The device of claim 16, wherein said first analyzing means comprises:
 word feature deriving means for deriving word features from the speech input;
 word shape deriving means for deriving word shaped from the speech input; and
 comparing means for comparing word features from said word feature deriving means with word shapes from said word deriving means to determine if coincidence exists therebetween;
 whereby to analyze the speech input as a relatively fast speech input by identifying words from the speech input when coincidence exists between the word features and the word shapes.

18. The device of claim 17, wherein said word feature deriving means comprises a first stage for tracking syllabit features in the speech input and providing, as an output, features for words in the speech input, and a second stage for accumulating the features for words provided as an output by said first stage.

19. The device of claim 18, wherein said first stage comprises a memory, a timer, means for providing an input corresponding to the speech input to said memory and said timer, and further means for providing to said timer timing information relating to a duration of each syllabit feature in the speech input, said timer and said memory using the timing information to provide an output identifying each syllabit in the speech input in terms of the features for words in the speech input.

20. The device of claim 17, wherein said word shape deriving means comprises a syllaphone scanner and sequencer responsive to the speech input for scanning and sequencing syllaphones within the speech input, said syllaphone scanner and sequencer providing syllaphone outputs corresponding to said word shapes, said word shape deriving means further comprising a syllabit grouper for grouping syllaphones into syllabits, a first storage unit for storing word shapes according to syllabit constituents as determined by said syllabit grouper, and a second storage unit for storing word shapes according to distinctive syllabit features for each word.

21. The device of claim 20, wherein said syllaphone scanner and sequencer comprises at least one of a sound separator and a plosive sensor for scanning and sequencing the syllaphones within the speech input to provide the syllaphone outputs corresponding to the word shapes.

22. The device of claim 21, wherein said syllaphone scanner and sequencer comprises a sound separator, said sound separator providing as an output an unvoiced fricative gate signal and a voiced fricative gate signal, said timing means being connected to said syllaphone scanner and sequencer for receiving the unvoiced fricative gate signal and the voiced fricative gate signal, said timing means being responsive thereto for providing, as an output, a timed indication of voiced and unvoiced fricatives, thereby determining whether the speech input is a relatively fast speech input or a relatively slow speech input.

23. The device of claim 20, wherein said syllabit grouper comprises a syllabit definer, a memory and a syllabit redefiner, said syllabit definer and said memory each receiving syllaphone outputs of said syllaphone scanner and sequencer, said syllabit definer and said syllabit redefiner being connected to said memory for accessing said memory, said syllabit definer providing an output indicating the grouping of syllaphones into syllabits based on an initial speech input, said syllabit redefiner providing an output indicating grouping of syllaphones into syllabits based on reprocessing subsequent to said initial speech input.

24. A method for producing an output corresponding to a visual representation of a speech input, comprising the steps of:
(a) timing the speech input to determine whether the speech input is a relatively fast speech input or a relatively slow speech input;
(b) analyzing the speech input as a relatively fast speech input to obtain a fast speech output when timing step (a) results in a determination that the speech input is a relatively fast speech input; and
(c) analyzing the speech input as a relatively slow speech input to obtain a slow speech output when timing step (a) results in a determination that the speech input is a relatively slow speech input;
wherein the speech input is analyzed as a relatively slow speech input based on identification of phonemes in the speech input, and wherein the speech input is analyzed as a relatively fast speech input based on processing of word features and word shapes derived from the speech input.

25. The method of claim 24, wherein said analyzing step (b) comprises:
deriving word features from the speech input;
deriving word shapes from the speech input; and
comparing the word features with the word shapes to determine if coincidence exists therebetween;
whereby to analyze the speech input as a relatively fast speech input by identifying word from the speech input when coincidence exists between the word features and the word shapes.

26. The method of claim 25, wherein said word feature deriving step comprises tracking syllabit features in the speech input to provide features for words identified in the speech input, and accumulating the features for words identified in the speech input by said tracking step.

27. The method of claim 25, wherein said word shape deriving step comprises scanning and sequencing syllaphones within the speech input to provide syllaphone outputs corresponding to said word shapes, grouping syllaphones in the syllaphone outputs into syllabits, storing word shapes according to syllabit constituents as determined by the grouping step, and storing word shapes according to distinctive syllabit features for each word.

28. The method of claim 27, wherein said scanning and sequencing step comprises performing at least one of sound separating and plosive sensing so as to scan and sequence the syllaphones within the speech input to provide the syllaphone outputs corresponding to the word shapes.

29. The method of claim 28, wherein said scanning and sequencing step comprises sound separating, said sound separating resulting in the generation of a voiced fricative gate signal and an unvoiced fricative gate signal, said step (a) comprising processing said voiced fricative gate signal and said unvoiced fricative gate signal to generate a timed indication of voiced and unvoiced fricatives, thereby determining whether the speech input is a relatively fast speech input or a relatively slow speech input.

30. The method of claim 27, wherein said grouping step comprises defining syllabits based on processing of an initial speech input, and redefining syllabits based on processing carried out subsequent to said initial speech input.

* * * * *